E. B. HESS.
PAPER GAGE FOR TYPE WRITING MACHINES.
APPLICATION FILED JAN. 31, 1913.
1,168,207.
Patented Jan. 11, 1916.
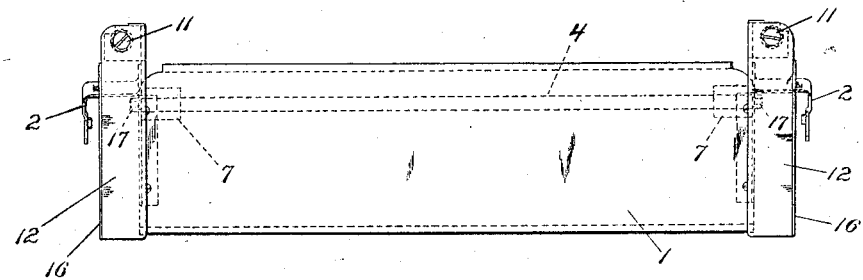
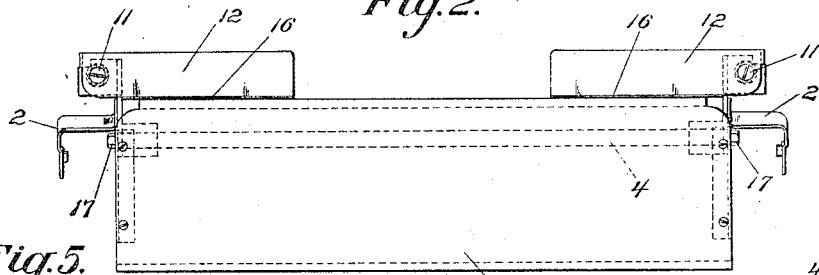
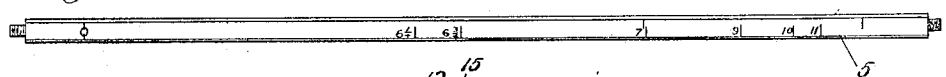
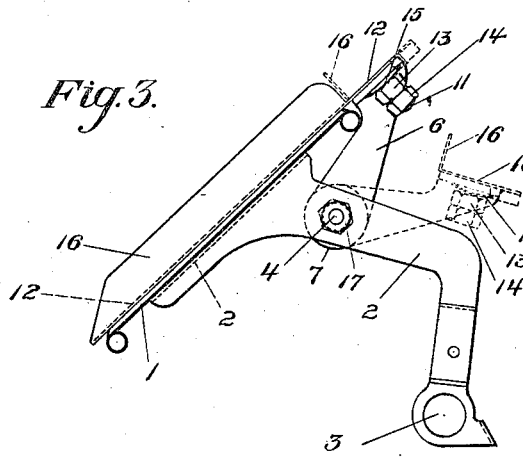
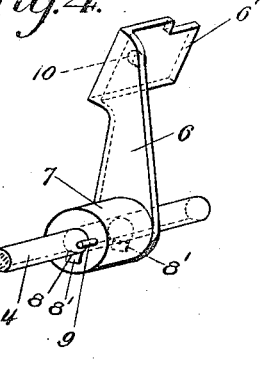
WITNESSES:
L. L. Browning
M. L. Smith
INVENTOR
Edward B. Hess
Edward C. Dandoui
his ATTORNEY.

UNITED STATES PATENT OFFICE.

EDWARD B. HESS, OF BROOKLYN, N. Y., ASSIGNOR, BY MESNE ASSIGNMENTS, TO ROYAL TYPEWRITER COMPANY, INC., OF NEW YORK, N. Y., A CORPORATION OF NEW YORK.

PAPER-GAGE FOR TYPE-WRITING MACHINES.

1,168,207.
Specification of Letters Patent.
Patented Jan. 11, 1916.

Application filed January 31, 1913. Serial No. 745,329.

*To all whom it may concern:*

Be it known that I, EDWARD B. HESS, a citizen of the United States of America, residing in the borough of Brooklyn, county of Kings, and State of New York, have invented a certain new and useful Improvement in Paper-Gages for Type-Writing Machines, of which the following is a specification.

This invention comprises broadly a paper gage located at one side of the paper table (or there may be a gage at each side) adjustable longitudinally of the paper table and adapted to be moved away from the paper table below and in rear thereof to such extent, if desired, as to be unobservable to the operator sitting in front of the machine.

In the accompanying drawing: Figure 1 is a plan view with the paper gages in operative position: Fig. 2, a plan view with the paper gages turned to inoperative position: Fig. 3, a transverse section showing in full lines a paper gage in operative position and in dotted lines the gage turned into inoperative position, and also in dotted lines the gage removed from the plane of the platen in rear and below the rear edge of the paper table: Fig. 4, a detail perspective view showing an adjustable bracket of one of the paper gages and the shaft upon which both gage brackets may be mounted: and Fig. 5, an elevation of the transverse supporting bar upon which the scale carrying brackets are mounted and longitudinally adjustable.

The paper table 1 is carried at each end upon a bracket arm 2 that is adapted to be swung rearwardly about an axis 3 so as to expose to the view and convenient access of the operator any devices, such for instance, as margin and tabular stops located in rear of the table and below the rearwardly extending parts of the brackets 2. This general plan of rearwardly swinging paper table is described and claimed in my Letters Patent, No. 958,497 granted May 17, 1910. Carried in and extending between two such brackets 2 is the transverse shaft 4. This shaft has one of its sides flattened as at 5 and such flat face has inscribed thereon a scale of any appropriate reading as seen in Fig. 5. Each paper gage is mounted upon an arm or bracket 6 having a hub 7 that turns upon and is longitudinally movable on the shaft 4. In the hub in the space formed by the flat face of the shaft is laid a flat arched spring 8 that bears against the flat face of the shaft and holds the arm 6 in any position to which it is adjusted. The spring is held in place by its ends 8' that are turned down against the end faces of the hub. In one end of the hub is fixed a pin 9 that limits rotation on the shaft by abutting against the end of the spring. The arm or bracket 6 has at its outer upper end a flat right angular projection 6' apertured at 10 to receive a threaded bolt 11 the outer kerfed head of which is seated in a tapered countersunk recess in the bottom plate 12 of the paper gage. Around the bolt 11 and bearing against the under face of plate 12 is a cup-shaped elastic washer 15 held with sufficient tension against the plate by a nut 13 and lock nut 14. The gage is thus pivotally connected with the bracket arm 6 under such friction that the gage 12 will remain in any position to which it is swung about the bolt 11. This gage comprises the flat bottom part and a gage edge 16 turned up at right angles to the flat part. The plane in which the gage turns is such that the bottom part thereof is close to or in contact with the upper face of the paper table. Two such gages, one adjacent each end of the paper table are shown in operative position in Fig. 1. In Fig. 2 they are turned through one-quarter of a revolution so that they lie along and beyond the rear edge of the paper table. The shaft 4 is held by nuts 17 applied to its respective ends. The friction connection of each bracket arm 6 with shaft 4 permits longitudinal adjustment of the bracket arm on the shaft with respect to the scale 5 inscribed on the flat face of the shaft: and also permits the arm to stand in normal operative position as shown in Fig. 3, or be swung rearwardly as shown in dotted lines to a position in rear of and below the platen where it may be unobservable by the operator. By throwing the paper table backward about the axis 3 the flat face of the shaft 4 would be in clear view of the operator who may then adjust the bracket arm 6 on the shaft being guided in so doing by the scale inscribed upon the flat face of the shaft.

The paper gage herein described may properly be called a disappearing gage for the reason that when not needed it may be swung to the position shown in dotted lines in Fig. 3. The gages, therefore, will not when not in use interfere with the handling and feeding of sheets to be printed upon. So far as I am aware, I am the first to propose such a gage and therefore claim it broadly.

I claim:

1. The combination with the paper table of a typewriting machine of a paper gage adapted to coöperate with the table and pivotally movable about two axes one perpendicular to the table and the other parallel with the transverse length of the table for the purpose set forth.

2. The combination with the paper table of a typewriting machine of a paper gage adapted to coöperate with the table and movable about two axes one perpendicular to the table and the other parallel with the transverse length of the table and means whereby the paper gage is adjustable longitudinally of the table for the purpose set forth.

3. The combination with the paper table of a typewriting machine, of a paper gage, a pivotal support therefor at the rear of the table upon which the gage may be turned to operative position transversely across the face of the table or to inoperative position parallel with the table, and supporting means carrying said pivotal support and mounted to rock about a transverse axis parallel with the table whereby said supporting means may be rocked rearwardly and downwardly away from the rear of the paper table.

4. The combination with the paper table of a typewriting machine, of a pair of rearwardly downwardly extending table supporting arms adapted to rock about a horizontal axis, a cross rod extending between said arms adjacent the paper table, an upwardly extending paper gage supporting arm rotatable about the axis of said rod and adjustable longitudinally therealong, a pivotal support for a paper gage carried by the upper end of said arm and the axis of which is perpendicular to the plane of the table and a paper gage mounted upon said pivotal support all for the purpose set forth.

5. The combination with the paper table of a typewriting machine, of a paper gage support mounted to swing about an axis parallel or substantially so to the table to a position below the rear edge of the table, and a paper gage pivotally mounted on said support and adapted to disappear therewith behind the paper table.

6. The combination with the paper table of a typewriting machine, of a gage carrier mounted in rear of the table, adjustable longitudinally thereof and movable rearwardly therefrom, and a gage having a pivoted connection on the carrier the axis of which is transverse to the table, whereby the gage may be turned into a position parallel with the table and also be moved rearwardly away from the table.

7. The combination of a paper table of a typewriting machine, of a rod arranged longitudinally thereof in rear of and in fixed relation thereto, a gage carrier mounted to turn about the rod and be adjustable longitudinally thereof whereby the gage carrier may be moved rearwardly away from the table and a gage pivotally mounted upon said carrier to turn about an axis transverse to the plane of the table.

In testimony whereof, I have hereunto subscribed my name.

EDWARD B. HESS.

Witnesses:
L. C. MYERS,
A. J. SHERIDAN.